Aug. 4, 1953  H. J. HORN  2,647,423
MACHINE FOR ROLLING TAPERED DISKS
Filed Aug. 7, 1946  8 Sheets-Sheet 1

INVENTOR
HARRY J. HORN
BY
Carroll R. Faber
ATTORNEY

Aug. 4, 1953 H. J. HORN 2,647,423
MACHINE FOR ROLLING TAPERED DISKS
Filed Aug. 7, 1946 8 Sheets-Sheet 2

INVENTOR
HARRY J. HORN
BY
*Carroll R. Taber*
ATTORNEY

Aug. 4, 1953 H. J. HORN 2,647,423
MACHINE FOR ROLLING TAPERED DISKS
Filed Aug. 7, 1946 8 Sheets-Sheet 3

INVENTOR
HARRY J. HORN
BY
Carroll R. Taber
ATTORNEY

Aug. 4, 1953     H. J. HORN     2,647,423
MACHINE FOR ROLLING TAPERED DISKS

Filed Aug. 7, 1946     8 Sheets-Sheet 4

INVENTOR
HARRY J. HORN
BY
*Carroll R. Toh*
ATTORNEY

Aug. 4, 1953 H. J. HORN 2,647,423
MACHINE FOR ROLLING TAPERED DISKS
Filed Aug. 7, 1946 8 Sheets-Sheet 5

INVENTOR
HARRY J. HORN
BY
ATTORNEY

INVENTOR
HARRY J. HORN

Aug. 4, 1953 — H. J. HORN — 2,647,423
MACHINE FOR ROLLING TAPERED DISKS
Filed Aug. 7, 1946 — 8 Sheets-Sheet 8

INVENTOR
HARRY J. HORN
ATTORNEY

Patented Aug. 4, 1953

2,647,423

UNITED STATES PATENT OFFICE 2,647,423

MACHINE FOR ROLLING TAPERED DISKS

Harry J. Horn, Lansing, Mich., assignor to Motor Wheel Corporation, Lansing, Mich., a corporation of Michigan Application August 7, 1946, Serial No. 688,878

9 Claims. (Cl. 80—16)

This invention relates to the rolling of tapered disks, and more particularly to a novel method and machine for tapering the thickness of metal disks by enlarging the diameter thereof.

The principal object of this invention is to provide an efficient method of forming tapered disks which can be practiced by using a simple and inexpensive form of rolling mill. The manner of accomplishing this and other objects of the invention will be readily apparent from the following description when read in connection with the accompanying drawings, wherein.

Figure 1:
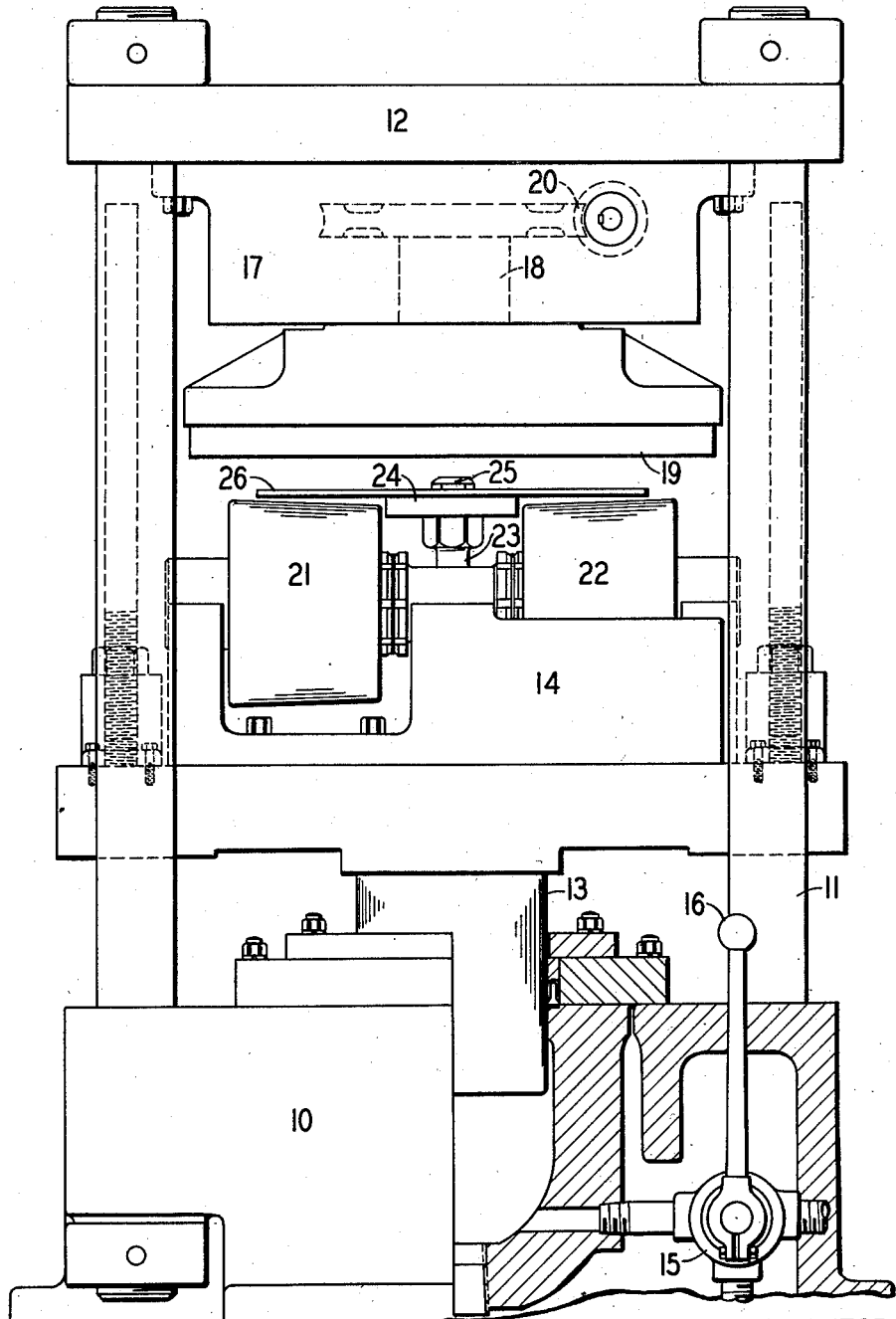
Figure 1 is a front elevational view, partly in section, of a rolling mill embodying the invention.

The machine shown in Figure 1 is a hydraulic press including a base 10, vertical frame members 11, a top frame member 12, a ram 13 mounted for vertical movement, and a carrier 14 supported upon the ram. The ram 13 is adapted to be moved vertically under hydraulic pressure, in a conventional manner. The action of the ram is controlled by a valve 15 which is operated by hand lever 16.

Suspended from the top frame 12 is a stationary supporting member 17 within which is mounted for rotation a shaft 18 carrying a platen 19. The shaft 18 and the platen 19 are rotated by means of any suitable source of power, not shown, through a gear assembly shown at 20.

A pair of rolls 21 and 22 are supported by carrier 14 upon horizontal shafts for free rotation upon their respective axes. The rolls are arranged with their axes radially offset in relation to the vertical axis of the platen 19, and the two rolls are spaced circumferentially approximately 180° apart (see Figures 2 and 11). The rolls 21 and 22 are also located in spaced relation to the vertical axis of the platen 19 and are arranged to cooperate with the platen in a manner to be described presently.

As here shown, the rolls 21 and 22 are tapered. That is, the circumference of each roll at the end nearest the axis of the platen is smaller than the circumference at the opposite end thereof. Otherwise, the diameter of each roll increases uniformly from what may be termed the inner end thereof to the outer end thereof. The amount of the increase is predetermined in relation to the amount of taper desired in the disk upon which the rolls operate. As the description progresses, it will become apparent that the rolls may be of uniform diameter throughout their axial extent and the platen may be tapered. However, as here shown, the rolls are tapered and the platen is flat.

Figure 3:
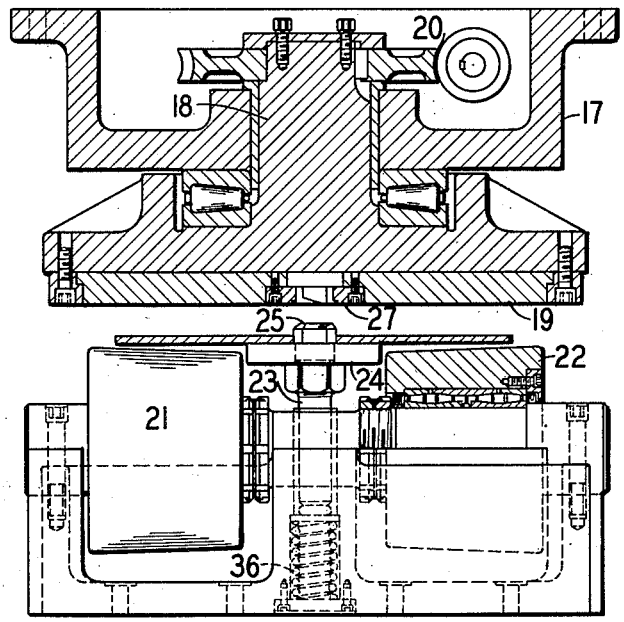
Figure 3 is a sectional elevation of a portion of the machine of Figure 1, showing the platen and roll assembly in open position.
Figure 6:
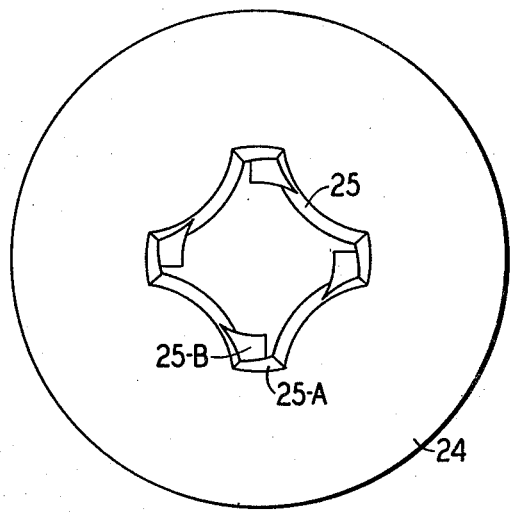
Figure 6 is a top plan view of the disk supporting plate and driving pin shown in Figure 1.
Figure 8:
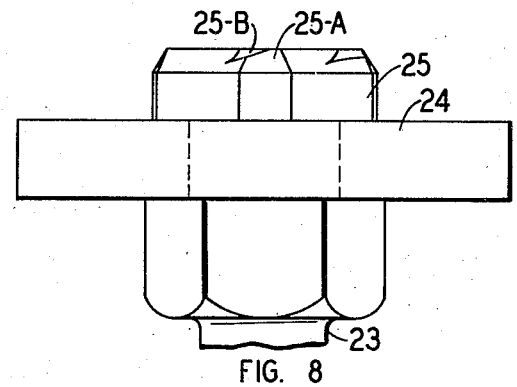
Figure 8 is a side elevational view of the structure shown in Figure 6.

Also mounted upon the carrier 14 is a vertical shaft 23 having a disk supporting plate 24 and a disk engaging pin 25 at its upper extremity (see Figures 6 and 8). As best shown in Figure 3 and for reasons which will appear presently, a spring 36 is associated with the lower end of shaft 23 and normally holds the shaft in the upwardly extended position shown in Figures 1 and 3. Shaft 23 is mounted for free rotation about its vertical axis.

Disk engaging pin 25 is formed to the configuration shown in Figures 6 and 8. That is to say, the pin is of generally rectangular section with the top being bevelled vertically and circumferentially adjacent the corners as shown at 25a and 25b. Pin 25 is of sufficient height that it projects above the upper surface of a disk 26 when the latter is mounted upon plate 24 as shown in Figure 1. It will be understood that the disk 26 is provided with a central opening of a generally rectangular configuration adapted to receive pin 25. As shown in Figure 1, disk 26 is in the form of a blank of uniform thickness which is to be tapered.

Figure 2:
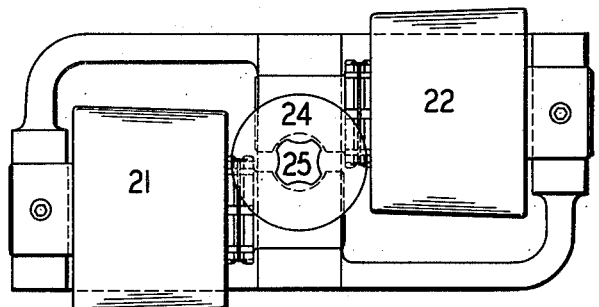
Figure 2 is a top view of the roller assembly shown in Figure 1.
Figure 5:
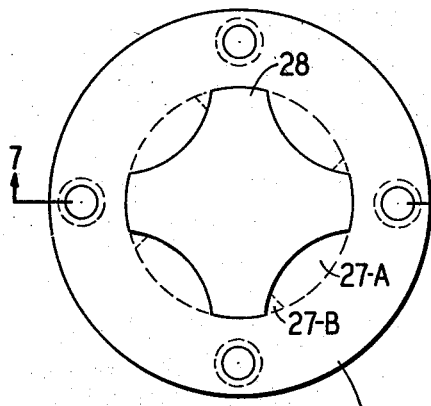
Figure 5 is a bottom plan view of a mating plate forming a part of the platen shown in Figure 1.
Figure 7:
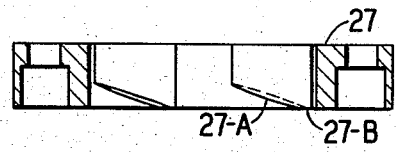
Figure 7 is a sectional view taken on the line 7—7 of Figure 5.

Platen 19 has secured in a recess in the center thereof a plate 27 (see Figure 2). The details of plate 27 are shown in Figures 5 and 7. It is provided with a central opening 28 of size and shape to receive pin 25. The side walls defining the opening 28 are bevelled as indicated at 27a and 27b to permit a mating of the pin 25 with the opening 28, while one of the members is rotating and the other is stationary. In other words, the complementary bevelled surfaces 25a and 25b of the pin and 27a and 27b of the plate permit the pin 25 to be fed into the opening 28 while only one of the members is rotating. Once pin 25 is mated with opening 28, the pin 25 and platen 19 will rotate together.

In operation, the rolling mill is initially in the open position shown in Figures 1 and 3. Platen 19 is rotated at an appropriate speed by means of any suitable source of power through the gear assembly 20 and shaft 18. A disk blank 26, heated to an appropriate temperature, is mounted upon plate 24 with pin 25 extending through a central opening in disk 26. At this point it will be observed that disk 26 is out of contact with both the platen 19 and the rolls 21 and 22.

After the disk 26 has been mounted as shown in Figures 1 and 3, hydraulic pressure is applied to the ram 13 which causes the ram to move vertically upward until pin 25 engages opening 28 and disk 26 contacts platen 19. Thereupon, the rotary movement of the platen is imparted to the pin 25, shaft 23, plate 24 and disk 26. As the ram 13 continues to move upwardly, shaft 23 is depressed against the action of spring 36 until rolls 21 and 22 engage the under surface of the rotating disk 26. As the rolls contact the disk they are revolved about their axes by frictional engagement with the disk.

The amount of hydraulic pressure against ram 13 is appropriately regulated so as to cause the rolls 21 and 22 to force the metal of the disk radially outwardly. The rolls first engage the periphery of the disk and progressively engage the disk further inwardly as the periphery is thinned by flowing the metal of the disk radially outwardly.

Figure 4:
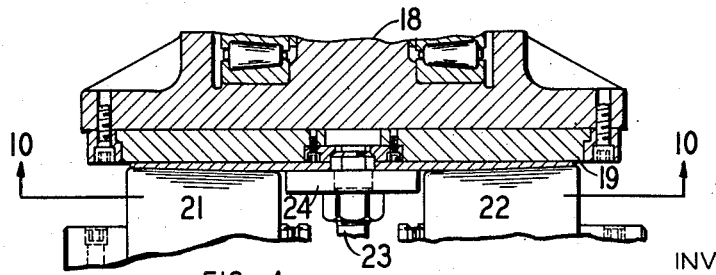
Figure 4 is a sectional view generally similar to Figure 3 but showing the platen and roll assembly in closed position.

During the rolling operation just described, the rolling machine is in the closed position shown in Figure 4.

The rolling operation is of brief duration, the exact length of time depending upon the original thickness of the disk, the amount of taper required, the temperature of the disk blank, the speed of rotation of the disk and the pressure applied against the disk by the rolls. Satisfactory results have been obtained by heating a blank of $\frac{1}{32}$" thickness to a temperature of approximately 2000° F., rotating the blank at approximately 150 R. P. M., and applying approximately 30 tons pressure to the rolls. The rolling operation lasts approximately 5 seconds. This resulted in an enlargement of approximately 1½" to the diameter of a disk which was initially of approximately 10¼" diameter.

Figure 11:
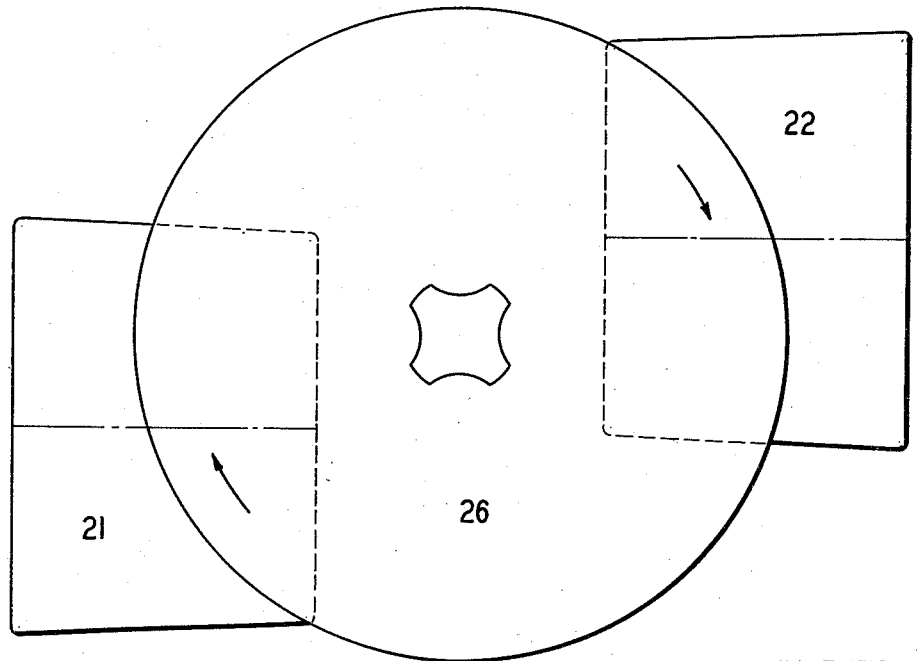
Figure 11 is a schematic view showing the relative position of the disk and the rolls before the rolling operation begins.
Figure 12:
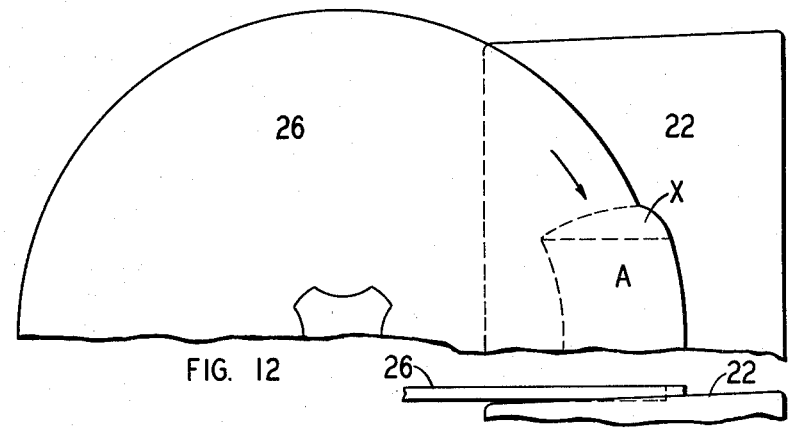
Figures 12, 13 and 14 are schematic views showing the position and progressive effect upon the disk as the rolling operation proceeds.
Figure 13:
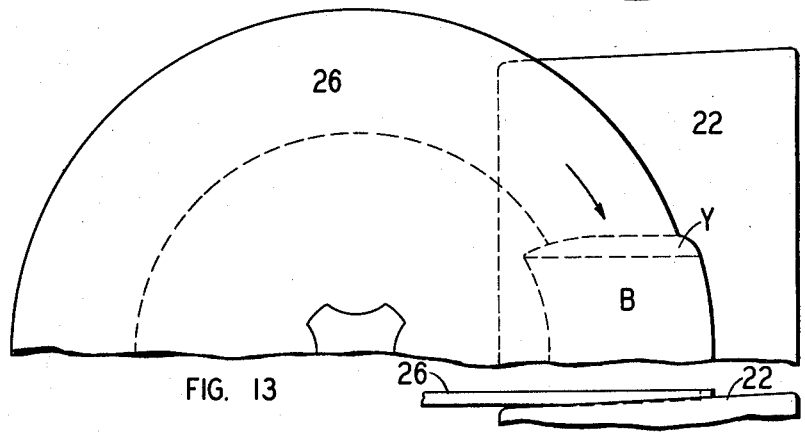
Figure 14:
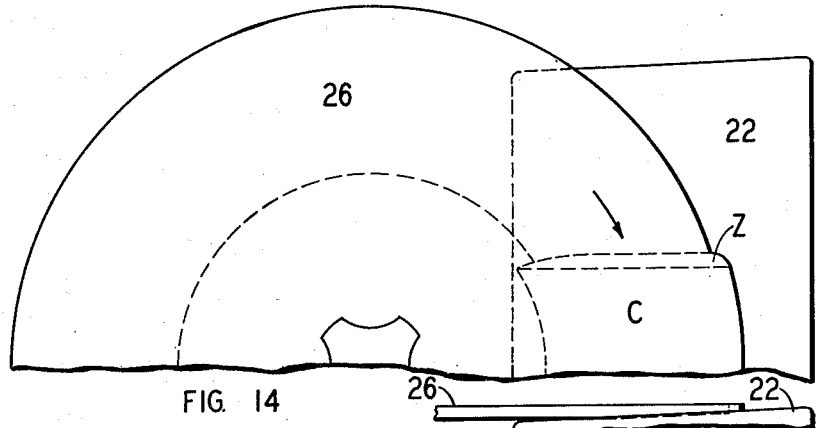
Figure 15:
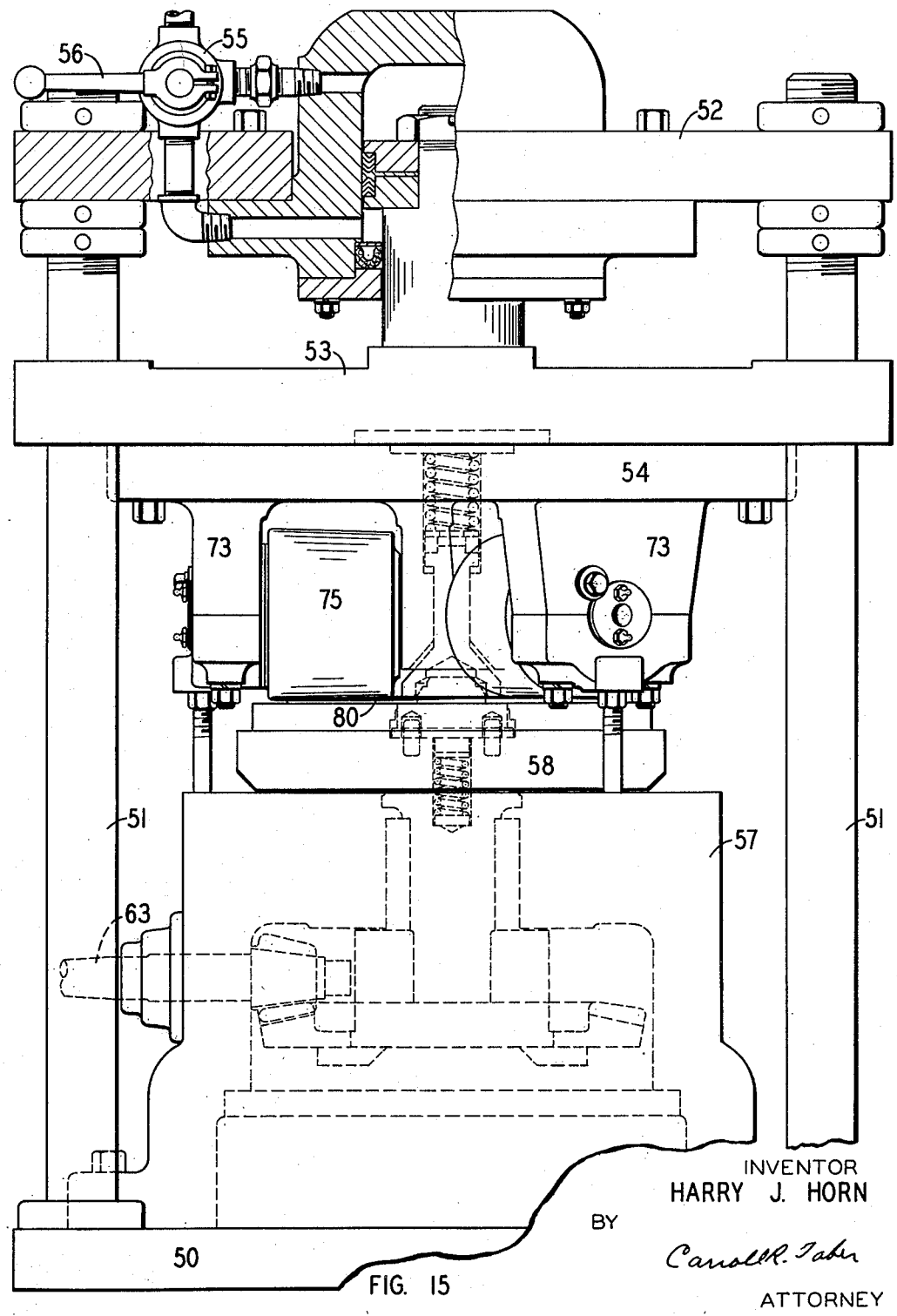
Figure 15 is a front elevational view, partly in section, of a further modified form of rolling mill.

The position of the rolls 21 and 22 in relation to the disk 26 is indicated diagrammatically in Figure 11. Figures 12, 13 and 14 diagrammatically illustrate the relation of one roll 22 to the disk as the rolling operation progresses, indicating the gradually increasing zone of contact between the roll and disk and the gradually widening area which has been rolled. The direction of rotation of the platen is indicated by the area in each of Figures 12, 13 and 14.

Figure 12 illustrates diagrammatically the disk 26 and roll 22 shortly after the rolling operation is begun. The relatively small rectangular area designated A is the area which has been completely rolled by roll 22 during the first pass of the disk against the roll. A small generally triangular area designated X is the zone of contact between the roll 22 and the disk. The rest of the disk shown in Figure 12 has not yet been touched by the roll.

Figure 13 designates the disk 26 and roll 22 after the first complete pass of the disk over the roll and after the second pass is started. The area designated B is the area which has been rolled during this pass. The area Y is in the zone of contact between the roll and disk, while the large annular area A is the area which was rolled during the previous pass of the roll.

Figure 14 illustrates the position of the disk and roll as the third pass is begun. Area B designates the area of the disk which was rolled during the previous pass. Area C designates the area rolled during the third pass of the roll, and area Z designates the zone of contact between the roll and disk.

The theoretical flow of metal of the disk in response to the pressure exerted by the roll 22 is illustrated in the zones designated X, Y and Z respectively. It will be apparent that because the axis of the roll 22 does not intersect the axis of the platen there is a component of force resulting from the rotation of the disk and the pressure applied by the roll in a radially outward direction. Consequently, the disk is tapered radially outwardly adjacent its periphery and the diameter of the disk is at the same time enlarged.

After the rolling operation has been completed, the pressure in ram 13 is released and the machine parts return to the open position shown in Figures 1 and 2. The tapered disk may then be removed and a new blank may be installed and the operation repeated.

Figure 9:
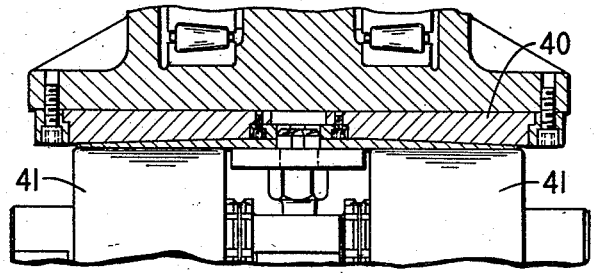
Figure 9 is a sectional view of the platen and rolls of a modified form of the invention.
Figure 10:
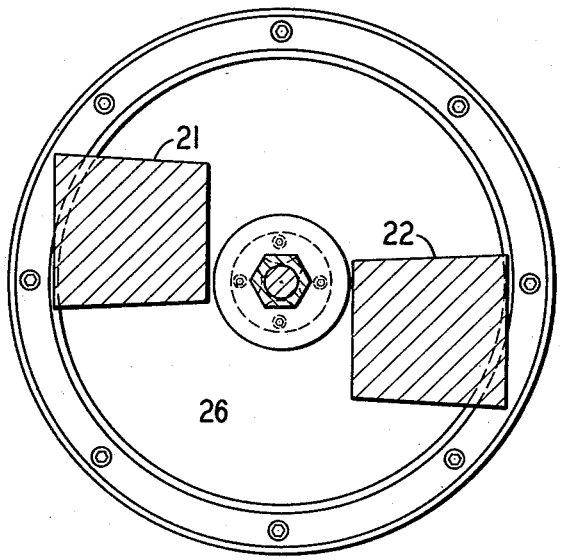
Figure 10 is a sectional view taken on the line 10—10 of Figure 4.

Figure 9 is a view similar to Figure 4 illustrating a slightly modified form of the invention. The only essential difference between the two devices is that in Figure 9 the rolls are cylindrical and the platen is dished or tapered.

The rolling mill shown in Figure 9 includes a platen 40 and a pair of rolls 41. Platen 40, as will be apparent from Figure 9, is very slightly dished upwardly and toward the center. The rolls 41 are cylindrical. All other parts of the mill are the same as the mill previously described, and the rolling action of the rolls and the disk is also the same.

While theoretically satisfactory results could be obtained by use of a single roll, it has been found that in practice best results are obtained by the use of two or more rolls arranged as rolls 21 and 22 are herein shown and described.

A modified form of rolling mill is illustrated in Figures 15 to 18. The rolling mill shown in those figures utilizes three rolls, as mentioned in the preceding paragraph, but the manner of mounting them is different. In the rolling mill of Figures 15 to 18 the platen is below the work while the rolls are above it.

The rolling mill shown in Figures 15 to 18 comprises a base 50, vertical frame members 51, a top frame member 52, a ram 53 mounted for vertical movement, and a carrier 54. The ram is adapted to be raised and lowered by hydraulic pressure in a manner well known in the art. The movement of the ram is controlled by a valve 55 operated by a hand lever 56.

A support 57 is affixed to the base 50. The support 57 carries a platen 58 having a shaft 59 rotatably mounted in the support by suitable bearings including bearings 60. A large bevel gear 61 is keyed to shaft 59. The large gear 61 is driven by a beveled pinion 62 attached to a drive shaft 63. The latter may be connected to any suitable source of power.

A disk supporting plate 64 is mounted in a recess in the center of the platen 58. The plate 64 is prevented from rotating relative to the platen 58 by a plurality of studs 65 fixed to the platen and loosely received in recesses 66 in the lower face of the plate 64. The disk supporting plate 64 is urged upwardly by a spring 67 in a recess in shaft 59. The upward movement of the disk supporting plate is limited by cooperating shoulders 68 and 69 on the plate and platen, respectively.

In the center of the plate 64 is an upwardly projecting stud 70 having a plurality of radial projections 71 at the sides thereof, for a purpose which will appear presently.

The carrier 54 has a downwardly projecting bearing member 72 thereon, and three equidistantly spaced shaft supports 73. A shaft 74 extends through each shaft support and into a recess in the outer wall of bearing member 72. Each shaft is fixedly connected to the corresponding shaft support. A tapered roll 75 is rotatably mounted on each shaft by means of roller bearings 76. It will be noted that the axes of the shafts 74 and rolls 75 are not radially arranged relatively to the axis of the platen 58 but are spaced therefrom (see Figure 18).

A pressure plunger 77 is rotatably mounted about a vertical axis in the bearing member 72. The pressure plunger is biased downwardly by a spring 78 in a recess above the plunger. Spring 78 is relatively heavy, at least heavier than spring 67. The lower end of the plunger 77 is recessed at 79 to receive the stud 70.

Figure 16:
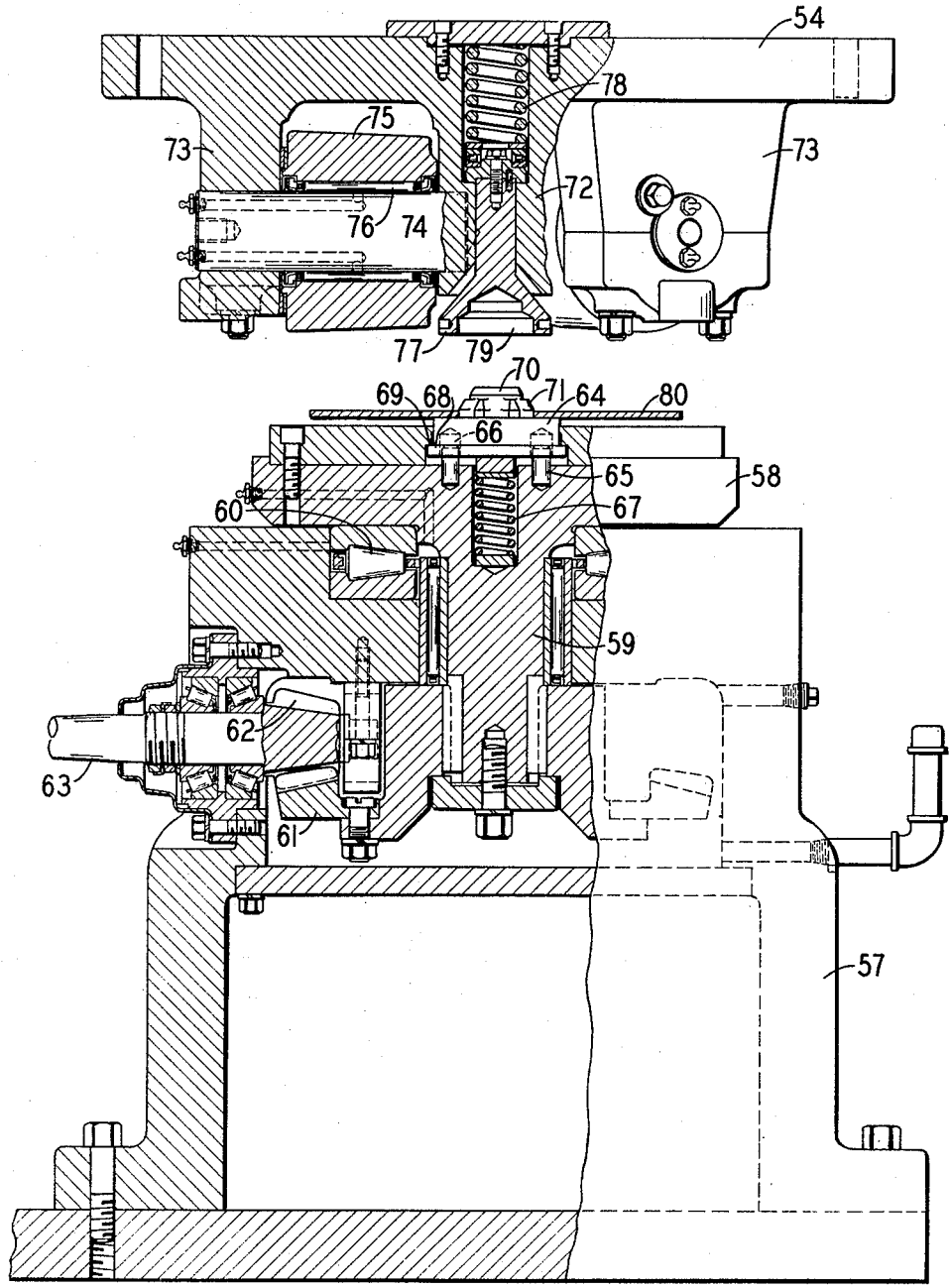
Figure 16 is an elevational view, partly in section, of a portion of the rolling mill of Figure 15, showing the platen and roll assembly in open position.
Figure 18:
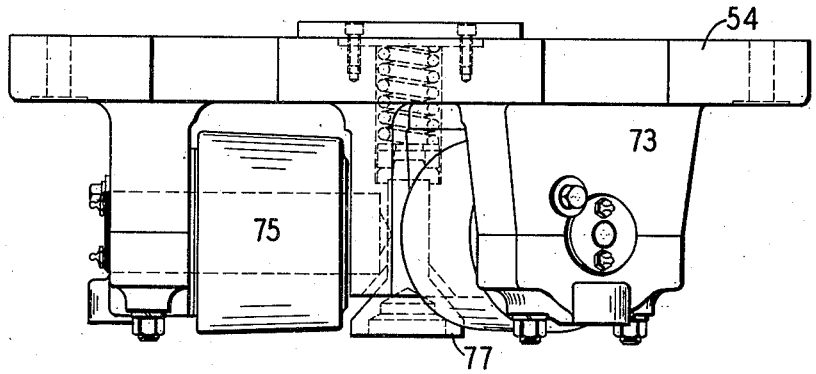
Figures 17 and 18 are, respectively, bottom plan and side elevational views of the roll assembly of the machine of Figure 15.
Figure 17:
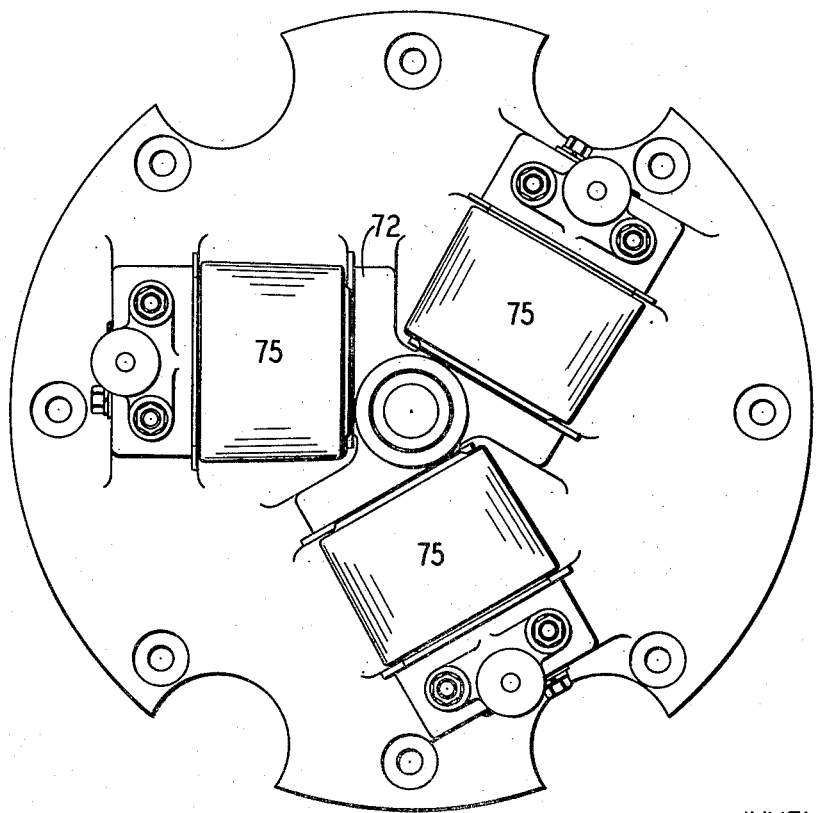

In operation the rolling mill is initially in the open position as shown in Figure 16. Platen 58 is rotated at an appropriate speed by the motor which rotates shaft 63 and the gears 61 and 62. A disk blank 80, having a central hole to fit the stud 70 and projection 71, and heated to the proper temperature is placed over the stud and onto the disk supporting plate 64. The disk 80 will immediately begin to rotate with the platen but is supported above the platen, so that it loses little heat thereto, by the plate 64.

Hydraulic pressure is applied to the ram by opening the valve 55 to the space above the ram piston to permit fluid under pressure to force the ram 53 and carrier 54 downward. The pressure plunger 77 contacts the disk 80 and forces the latter down against the platen 58. When the pressure plunger 77 contacts the disk 80 the former will be forced to rotate also, which it is permitted to do in bearing member 72.

The ram will continue downward until the rolls 75 bear on disk 80 with a heavy pressure. During this last short movement the spring 78 will give to permit the plunger 77 to move upward so that the rolls 75 can bear on the work.

The platen 58 and the disk 80 will, of course, be rotated beneath the rolls 75 and will be tapered and increased in diameter by the rolls in much the same manner as in the rolling mill previously described.

It will be noted that in the rolling mill shown in Figures 15 to 18 there is no need to provide a positive driving connection between the stud 70 and the pressure plunger as it is in the case of the parts 25 and 27 previously described, because in the former the stud is continuously driven by the platen 58.

While the essential elements of a machine embodying the present invention have been shown in the accompanying drawings and described in these specifications, it has not been considered necessary to either show or describe the details of conventional elements, such as the construction of the ram 13, the mounting of the carrier 14 upon its vertical guideways, or the construction of the bearings and shafts for supporting the rolls 21 and 22, and similar details, since they are all well known to those skilled in the art.

The scope of the invention is indicated in the appended claims.

I claim:

1. A machine for rolling tapered disks comprising a disk-like platen mounted for rotation on an axis perpendicular to the plane of the platen, a plurality of rolls mounted for rotation on axes parallel to the plane of the platen, said rolls being disposed in spaced relation to the platen with their axes arranged in radially offset and circumferentially spaced relation to the axis of the platen, centering means positioned on, and movable along, the axis of said platen and for rotatably supporting a disk to be tapered upon an axis perpendicular to the plane of the platen in spaced relation to the platen and the rolls, means for moving the disk support axially of said platen, means for moving the rolls relatively toward the platen and maintaining the rolls in fixed spaced relation to the axis of the platen whereby to cause the platen to engage one face and the rolls to engage the opposite face of a disk positioned between the platen and the rolls, and means for imparting a rotary movement to the platen, the said rolls and platen being tapered relative to each other so that the distance between the said rolls and the said platen is greatest nearest the axis of said platen and decreases from said axis toward the circumferential edge of said platen corresponding to the taper desired in the disk to be rolled.

2. The rolling machine defined in claim 1 wherein the centering means for rotatably supporting a disk comprises a resiliently mounted shaft positioned between said rolls and yieldable axially of said platen.

3. The rolling machine as defined in claim 2 wherein each of said rolls tapers inwardly toward the axis of rotation of said platen.

4. The rolling machine defined in claim 3 wherein the platen is positioned beneath the rolls and the rolls are adjustable downwardly and axially of said platen into rolling relation with a disk positioned between the platen and the rolls.

5. The combination defined in claim 2 wherein the rolls are cylindrical and the platen is dished.

6. The combination set forth in claim 1 wherein said disk support is freely rotatably and is biased in a direction towards said platen.

7. The combination set forth in claim 1 wherein said disk support is freely rotatable and is biased in a direction towards said platen, said rolls being positioned beneath said platen and being movable upwardly into rolling relation with a disk positioned on said disk support between said platen and rolls.

8. The combination set forth in claim 1 wherein said disk support is freely rotatable and is biased in a direction towards said platen, said rolls being positioned beneath said platen and being movable upwardly into rolling relation with a disk positioned on said disk support between said platen and rolls, said disk support projecting axially upwardly between said rolls and terminating at its upper end below the plane of said platen when the platen and rolls are relatively spaced apart to permit positioning of an apertured disk over the upper end of said disk support, said upper end of said disk support being adapted to telescopically engage with said platen when said rolls are moved upwardly and including means on said platen and said upper end of said disk support forming a driving connection between said platen when said platen is rotated and said support is telescoped therewith.

9. A machine for rolling tapered disks comprising a frame, a disk-like platen member mounted on said frame for rotation about an axis perpendicular to the plane of the platen member, a plurality of roll members mounted on said frame for rotation about fixed axes positioned in a plane substantially perpendicular to the axis of rotation of said platen, said roll members being arranged in radially offset and angularly spaced relation to the axis of the platen member, means supporting said rolls in fixed spaced relation to the axis of said platen, means supporting the said roll members on said frame for movement relative to said platen and parallel to the axis of the platen member, a support mounted on said frame centrally of said platen member for limited movement axially relative to said platen member for supporting a disk for rotation about the axis of the platen member and in spaced relation to the roll and platen members, said support retreating axially inwardly of said platen member when said platen member and rolls are moved axially relatively toward each other into rolling engagement with the disk positioned therebetween, means connected to the support means for said rolls for causing relative movement of said platen and rolls toward each other whereby to cause the platen to engage one face and the rolls to engage the opposite face of a disk positioned between the platen and the rolls, and means connected to said platen member for imparting a rotary movement thereto, the said roll and platen being tapered relative to each other so that the distance between the said roll and the said platen is greatest nearest the axis of said platen and decreases from said axis toward the circumferential edge of said platen corresponding to the taper desired in the disk to be rolled.

HARRY J. HORN.

References Cited in the file of this patent

UNITED STATES PATENTS

| Number | Name | Date |
|---|---|---|
| 337,230 | Bean | Mar. 2, 1886 |
| 366,109 | Hughes | July 5, 1887 |
| 1,708,321 | Otte | Apr. 9, 1929 |
| 1,897,645 | Swanson | Feb. 14, 1933 |
| 2,334,879 | LeJeune | Nov. 23, 1943 |
| 2,406,219 | Hight et al. | Aug. 20, 1946 |